US012570283B2

(12) United States Patent (10) Patent No.: US 12,570,283 B2
Olsson et al. (45) Date of Patent: Mar. 10, 2026

(54) LANE KEEPING BASED ON LANE POSITION UNAWARENESS

(71) Applicant: ZENSEACT AB, Gothenburg (SE)

(72) Inventors: Claes Olsson, Mölnlycke (SE); Enrico Lovisari, Gothenburg (SE)

(73) Assignee: ZENSEACT AB, Gothenburg (SE)

( * ) Notice: Subject to any disclaimer, the term of this patent is extended or adjusted under 35 U.S.C. 154(b) by 216 days.

(21) Appl. No.: 18/317,191

(22) Filed: May 15, 2023

(65) Prior Publication Data

US 2023/0365133 A1 Nov. 16, 2023

(30) Foreign Application Priority Data

May 16, 2022 (EP) ..................................... 22173583

(51) Int. Cl.
B60W 30/12 (2020.01)
B60W 10/20 (2006.01)
(Continued)

(52) U.S. Cl.
CPC ............ B60W 30/12 (2013.01); B60W 10/20 (2013.01); B60W 40/072 (2013.01); (Continued)

(58) Field of Classification Search
CPC .... B60W 30/12; B60W 10/20; B60W 40/072; B60W 40/08; B60W 50/14; (Continued)

(56) References Cited

U.S. PATENT DOCUMENTS

2009/0091435 A1* 4/2009 Bolourchi ............ B60K 28/066
340/575
2009/0299573 A1* 12/2009 Thrun .................. B62D 15/025
701/41
(Continued)

FOREIGN PATENT DOCUMENTS

DE 10311518 A1 11/2003
DE 102019209083 A1 8/2020
EP 3730332 A1 10/2020

OTHER PUBLICATIONS

European Search Report mailed Oct. 21, 2022 for European Application No. 22173583.0, 7 pages.

*Primary Examiner* — Phutthiwat Wongwian
*Assistant Examiner* — Susan E Scharpf
(74) *Attorney, Agent, or Firm* — Sage Patent Group

(57) ABSTRACT
A computer-implemented method and a device for controlling a lane support system of a vehicle are disclosed. The method includes obtaining data indicative of a driver of the vehicle being in an inattentive state, and determining an intended path of the driver at a point in time when the driver enters the inattentive state. The method further includes determining an unintended lateral deviation from the intended path by computing a function representative of a lateral deviation from the intended path of the driver. Moreover, the function is dependent upon at least one of a change in steering wheel angle, and a change in road geometry along the vehicle's traveling direction while the driver is in the inattentive state. When the determined unintended lateral deviation violates a threshold value, activating the lane support system to output a warning to the driver and/or to execute an intervention.

13 Claims, 4 Drawing Sheets

(51) Int. Cl.

| | |
|---|---|
| *B60W 30/18* | (2012.01) |
| *B60W 30/182* | (2020.01) |
| *B60W 40/072* | (2012.01) |
| *B60W 40/08* | (2012.01) |
| *B60W 50/14* | (2020.01) |

(52) U.S. Cl.

CPC ............ *B60W 40/08* (2013.01); *B60W 50/14* (2013.01); *B60W 30/18145* (2013.01); *B60W 30/182* (2013.01); *B60W 2040/0818* (2013.01); *B60W 2050/143* (2013.01); *B60W 2050/146* (2013.01); *B60W 2520/10* (2013.01); *B60W 2540/18* (2013.01); *B60W 2540/225* (2020.02); *B60W 2540/229* (2020.02); *B60W 2552/30* (2020.02); *B60W 2552/53* (2020.02); *B60W 2556/50* (2020.02)

(58) Field of Classification Search

CPC ......... B60W 30/18145; B60W 30/182; B60W 2040/0818; B60W 2050/143; B60W 2050/146; B60W 2520/10; B60W 2540/18; B60W 2540/225; B60W 2540/229; B60W 2552/30; B60W 2552/53; B60W 2556/50

See application file for complete search history.

(56) References Cited

U.S. PATENT DOCUMENTS

| | | | |
|---|---|---|---|
| 2012/0022739 A1* | 1/2012 | Zeng ................... | B60W 30/165 348/148 |
| 2013/0238192 A1* | 9/2013 | Breu .................... | B62D 15/029 701/41 |
| 2016/0146618 A1* | 5/2016 | Caveney ............... | B60W 50/16 701/25 |
| 2017/0267252 A1 | 9/2017 | Park et al. | |
| 2018/0111628 A1 | 4/2018 | Tamagaki et al. | |
| 2020/0269848 A1 | 8/2020 | Kang et al. | |
| 2020/0339133 A1* | 10/2020 | Olsson ................... | B60W 40/08 |
| 2021/0070359 A1 | 3/2021 | Lee | |
| 2021/0107479 A1 | 4/2021 | Limbacher et al. | |
| 2022/0118973 A1* | 4/2022 | Craigen ................ | B60W 30/12 |
| 2022/0363283 A1* | 11/2022 | Prill ...................... | B60W 40/08 |
| 2024/0208496 A1* | 6/2024 | Olsson ................ | B60W 30/146 |

* cited by examiner

LANE KEEPING BASED ON LANE POSITION UNAWARENESS

CROSS-REFERENCE TO RELATED APPLICATIONS

The present application for patent claims priority to European Patent Office Application Ser. No. 22173583.0, entitled "LANE KEEPING BASED ON LANE POSITION UNAWARENESS" filed on May 16, 2022, assigned to the assignee thereof, and expressly incorporated herein by reference.

TECHNICAL FIELD

The present invention relates to methods and systems for controlling a lane support system of a vehicle.

During the last few years, the research and development activities related to autonomous vehicles have exploded in number and many different approaches are being explored. An increasing portion of modern vehicles have advanced driver-assistance systems (ADAS) to increase vehicle safety and more generally road safety. ADAS—which for instance may be represented by adaptive cruise control (ACC), collision avoidance system, forward collision warning, lane support systems, etc.—are electronic systems that may aid a vehicle driver while driving. Today, there is ongoing research and development within a number of technical areas associated to both the ADAS and the Autonomous Driving (AD) field. ADAS and AD may also be referred to under the common term Automated Driving System (ADS) corresponding to all of the different levels of automation as for example defined by the SAE J3016 levels (0-5) of driving automation.

In a not too distant future, ADS solutions are expected to have found their way into a majority of the new cars being put on the market. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all or at least some tasks to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles, free-space areas, and/or relevant signage.

Road departures are a critical issue for Advanced Driver Assistance Systems and proper solutions to mitigate the risk of road departures are of utmost importance, moreover, road edge interventions are a part of EuroNCAP Lane Support System (LSS) rating. Generally, Lane Support Systems encompasses various subcategories, such as Emergency Lane Keeping (ELK), Lane Departure Warning (LDW), Lane Keep Assist/Aid (LKA) and so forth, which are designed to warn and assist drivers when they unintentionally leave a lane or when they change lanes without indication.

ADAS steering support for preventing unintended lane departures when driving in manual mode, in the form of LKAs, has been around for more than a decade. In general, these functions apply an overlay steer torque to the steering system in order to change direction of the vehicle with respect to the lane markers when the vehicle is about to depart from the lane (i.e. when it is about to cross the lane markers).

However, a problem with conventional ADAS steering support systems is that they may intervene at inappropriate or unwanted situations, causing driver dissatisfaction, which oftentimes results in that the driver chooses to de-activate the system all together. Consequently, the driver is left without any steering support and the desired safety benefits are reduced.

There is therefore a need for new and improved steering support solutions for ADAS-equipped vehicles, which are better at assessing when it is appropriate to activate the steering support and when it is not, so to reduce the number of unwarranted or unnecessary interventions.

SUMMARY

It is therefore an object of some embodiments to provide a method for controlling a lane support system (LSS), a computer program product, a computer-readable storage medium, a device, and a vehicle comprising such a device which alleviates or mitigates at least some of the drawbacks of currently known technology.

In particular it is an object of some embodiments to provide a solution for preventing unintended lane departures when, and only when, the driver's awareness of the vehicle's position in the lane is low.

Moreover, it is an object of some embodiments to provide a solution that reduces the number of unwarranted or unnecessary interventions by an LSS as compared to currently known technology.

These and other objects are achieved by means of a method for controlling a lane support system (LSS), a computer program product, a computer-readable storage medium, a device, and a vehicle comprising such a device as defined in the appended independent claims. The term exemplary is in the present context to be understood as serving as an instance, example or illustration.

According to a first aspect of the present invention, there is provided a computer-implemented method for controlling a lane support system of a vehicle. The method comprises obtaining data indicative of a driver of the vehicle being in an inattentive state, and determining an intended path of the driver at a point in time when the driver enters the inattentive state. The method further comprises determining an unintended lateral deviation from the intended path by computing a function representative of a lateral deviation from the intended path of the driver. Moreover, the function is dependent upon at least one of a change in steering wheel angle while the driver is in the inattentive state, and a change in road geometry along the vehicle's traveling direction while the driver is in the inattentive state. The method further comprises activating the lane support system when the determined unintended lateral deviation violates a threshold value, wherein the lane support system is configured to output a warning to the driver and/or to execute an intervention so to control a steering of the vehicle upon detection of a lane departure of the vehicle.

According to another aspect of the present invention, there is provided a computer program product comprising instructions which, when the program is executed by a computing device, causes the computer to carry out the method according to any one of the embodiments disclosed herein. With this aspect of the invention, similar advantages and preferred features are present as in the other aspects of the invention.

According to another aspect of the present invention, there is provided a computer-readable storage medium comprising instructions which, when executed by a computing device, causes the computer to carry out the method according to any one of the embodiments disclosed herein. With this aspect of the invention, similar advantages and preferred features are present as in the other aspects of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to yet another aspect of the present invention, there is provided a device for controlling a lane support system of a vehicle. The device comprises control circuitry configured to obtain data indicative of a driver of the vehicle being in an inattentive state, and determine an intended path of the driver at a point in time when the driver enters the inattentive state. The control circuitry is further configured to determine an unintended lateral deviation from the intended path by computing a function representative of a lateral deviation from the intended path of the driver. The function is dependent upon at least one of a change in steering wheel angle while the driver is in the inattentive state, and a change in road geometry along the vehicle's traveling direction while the driver is in the inattentive state. Moreover, the control circuitry is configured to activate the lane support system when the determined unintended lateral deviation violates a threshold value, wherein the lane support system is configured to output a warning to the driver and/or to execute an intervention so to control a steering of the vehicle upon detection of a lane departure of the vehicle. With this aspect of the invention, similar advantages and preferred features are present as in the other aspects of the invention.

According to another aspect of the present invention, there is provided a vehicle comprising a lane support system configured to output a warning to the driver and/or execute an intervention so to control a steering of the vehicle upon detection of a lane departure of the vehicle, and a device for controlling the lane support system of the vehicle according to any one of the embodiments disclosed herein. With this aspect of the invention, similar advantages and preferred features are present as in the other aspects of the invention.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

An advantage of some embodiments is that the LSS is allowed to intervene at more relevant situations and scenarios than with presently known technology.

An advantage of some embodiments is that risk of having the LSS intervening at inappropriate or unwanted situations, causing driver dissatisfaction, is reduced, thereby decreasing the probability of drivers deliberately deactivating the LSS, and consequently improving overall road safety.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Figure 1:
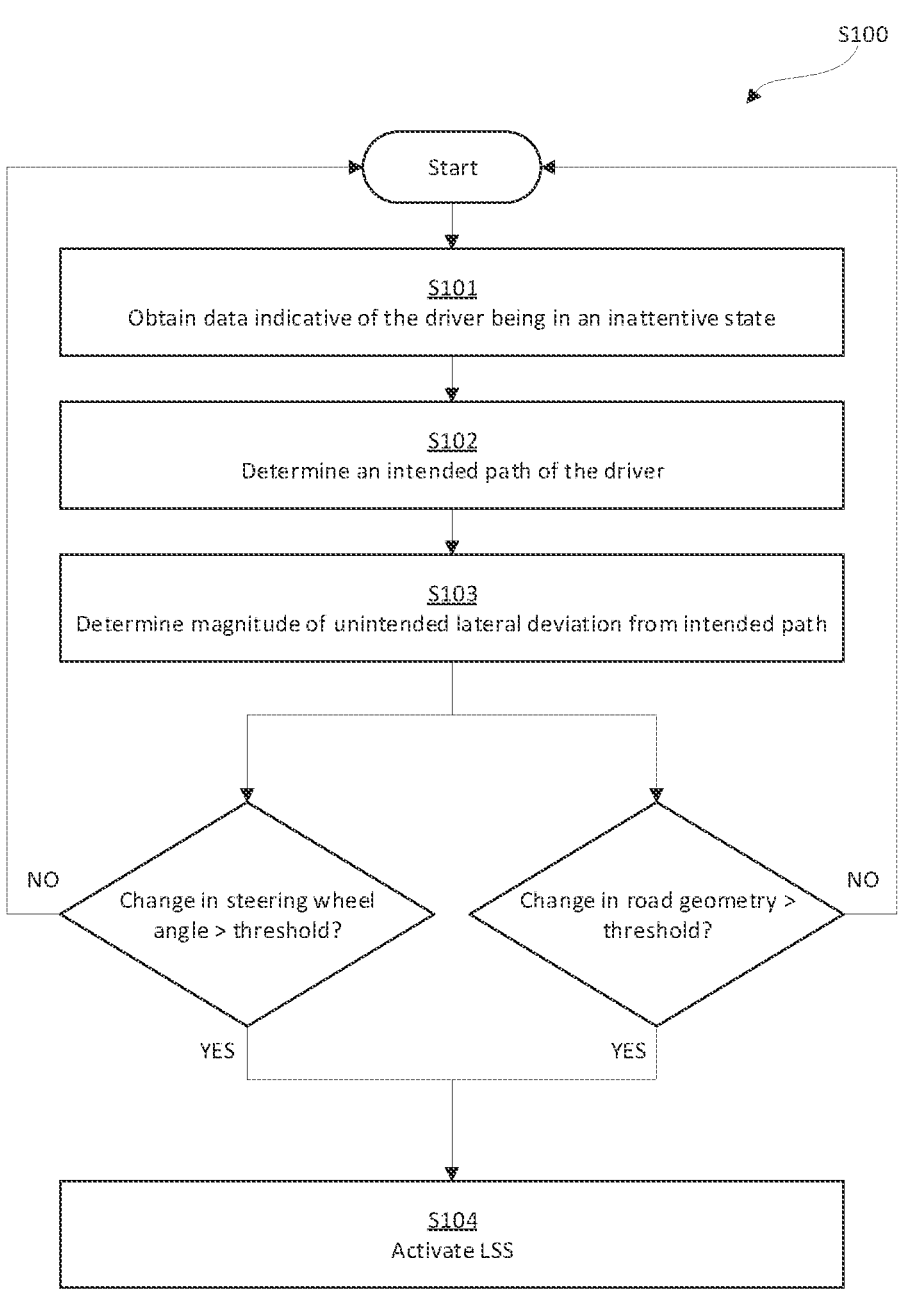
FIG. 1 is a schematic flow chart representation of a method for controlling a Lane Support System (LSS) of a vehicle in accordance with some embodiments.

In the following detailed description, embodiments of the present invention will be described. However, it is to be understood that features of the different embodiments are exchangeable between the embodiments and may be combined in different ways, unless anything else is specifically indicated. Even though in the following description, numerous specific details are set forth to provide a more thorough understanding of the present invention, it will be apparent to one skilled in the art that the present invention may be practiced without these specific details. In other instances, well known constructions or functions are not described in detail, so as not to obscure the present invention.

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs), Field Programmable Gate Arrays (FPGA) and/or using one or more Digital Signal Processors (DSPs). It will also be appreciated that when the present disclosure is described in terms of a method, it may also be embodied in one or more processors and one or more memories coupled to the one or more processors, wherein the one or more memories store one or more programs that perform the steps, services and functions disclosed herein when executed by the one or more processors.

As mentioned in the foregoing, many of the currently known Lane Support Systems intervene at inappropriate or unwanted situations, thereby causing driver dissatisfaction, which oftentimes results in that the driver chooses to deactivate the system all together. Consequently, the driver is left without any steering support and the desired safety benefits are reduced, and the overall road safety is impaired. However, in an attempt to mitigate this, some Lane Support Systems, such as Lane Keeping Assist (LKA) functions, are configured to use the turning signal/indicator to assess whether or not a lane departure is intentional. However, in many situations relying on the turning indicator for assessing the driver's intention is not sufficient to eliminate unmotivated interventions since there are a number of situations and conditions where the driver would like to cross a lane marker without using a turning indicator.

Examples of such situations where some conventional Lane Support Systems may execute an unmotivated intervention include when a driver is changing back to the original lane after an overtaking manoeuvre, when a driver is driving close to lane markers (or even on the lane markers) to create a safety distance to objects or other road users, when a driver is driving close to lane markers (or even on the lane markers) to smoothen a path curvature when there are no other road users on the road, when a driver is driving on a road where old lane markers (i.e. lane markers made obsolete by new markers) and/or snow is interpreted as actual lane markers and the LSS falsely assesses the situation as a lane departure. Accordingly, a technical objective of some embodiments disclosed herein is to improve the LSS functionality so to reduce the risk of false or erroneous activations. Moreover, the LSS functionality is made more adaptive and "intelligent" providing an improvement in overall comfort.

In short, some embodiments herein pertain to methods, computer program products and devices for controlling a Lane Support System of a vehicle. In more detail, it is an object of the present invention to provide a solution that provides steering support so to prevent unintended lane departures when the driver is concluded to have lower awareness of the vehicle's position in the lane. In more detail, it is presumed that all drivers (to some extent) have an idea about the lance position when looking away from the road and then looking back up again (i.e. a "mental model" of the road). The present inventors realized that the awareness of the vehicle's lane position may be considered to be proportional to the deviation from the expected lane position at the time when the gaze returns to the forward road scene (i.e. a so called "mental model mismatch"). The larger the deviation/mismatch, the higher the degree of surprise and the higher the risk to leave the lane unintentionally.

This "mental model" concept is used herein to assess whether or not a lane departure is intentional by determining an unintended lateral deviation from an intended path. Thereby enabling for efficient control of various Lane Support Systems with a good balance between False Positive (FP) and True Positive (TP) performance. The unintended lateral deviation forms a "pre-condition" or "secondary condition" for activating the LSS, and the fulfilment of this pre-condition is determined by computing a function indicative of an unintended lateral deviation caused by unintended steering or unnoticed road geometry changes. Stated differently, the function indicates the "mental model" mismatch to the real world. The unintended steering may for example occur while the driver is looking away from the road and unintentionally turns the steering wheel (e.g. while leaning when trying to reach for something in the back seat or under the passenger seat). The unnoticed road geometry changes may for example occur while the driver is looking away from the road ahead, and the road geometry changes significantly (e.g. a curve that straightens out).

FIG. 1 is a schematic flowchart representation of a method S100 for controlling a Lane Support System (LSS) of a vehicle. It should be noted that the term Lane Support System (LSS) is to be interpreted as any ADAS or AD function configured to output a warning to the driver and/or to execute an intervention so to control a steering of the vehicle upon detection of a lane departure of the vehicle. Moreover, a "vehicle" may in the present context be understood as any road vehicle such as a car, a motorcycle, a (cargo) truck, a bus, a smart bicycle, etc.

The method S100 comprises obtaining S101 data indicative of a driver of the vehicle being in an inattentive state. In the present context, an "inattentive state" may be understood as that the driver is not attentive to the road in front of the vehicle. This may for example be due the driver having his/her head turned away from the road in front of the vehicle and/or the general gaze direction of the driver not being towards the road in front of the vehicle. The term obtaining is herein to be interpreted broadly and encompasses receiving, retrieving, collecting, acquiring, and so forth.

Thus, in some embodiments, the step of obtaining S101 data indicative of the driver of the vehicle being in an inattentive state comprises obtaining a signal from a Driver Monitoring System (DMS) of the vehicle, the signal being indicative of the driver of the vehicle being in the inattentive state. In general, a driver-monitoring system (sometimes called a driver state sensing (DSS) system) is a safety feature that uses a camera suitably mounted within the vehicle (e.g. on the dashboard) in order to track driver drowsiness or distraction of the driver, and to issue a warning or alert to get the driver's attention back to the task of driving. In more detail, the DMS typically use a driver-facing camera equipped with infrared (IR) light-emitting diodes (LEDs) or lasers so that it can "observe" the driver's face and in particular the driver's eyes (even at night). Moreover, the DMS may comprise suitably programmed software configured to determine whether the driver is blinking more than usual, whether the eyes are narrowing or closing, and whether the head is tilting at an odd angle. It can also determine whether the driver is looking at the road ahead, and whether the driver is actually paying attention or just absent-mindedly staring.

Accordingly, in some embodiments, the DMS comprises one or more cameras and control circuitry configured to monitor a head position and/or gaze direction of the driver (the DMS may also optionally comprise one or more IR LEDs). Thus, if the control circuitry concludes that the driver's gaze direction is anywhere else than on the road in front of the vehicle, a signal may be output form the DMS indicating that the driver is in an inattentive state. Analogously, once the driver's gaze returns to the road in front of the vehicle, the DMS may output a signal that the driver has returned to an "attentive state".

However, in some embodiments, the determination of the driver being in an inattentive state may be based on the driver interacting with a Human-Machine-Interface (HMI) on board the vehicle, such as e.g. an on board infotainment system. Thus, the HMI may output a signal indicating that the driver is in an inattentive state if the driver starts to interact with the HMI (e.g. if the driver is searching for a radio station, interacting with a navigation feature, or otherwise tampering with a user-interface within the vehicle). Analogously, once the driver stops interacting with the HMI, the HMI may output a signal that the driver has returned to an "attentive state". Moreover, the determination of the driver being in an "inattentive state" based on HMI interactions may be based only on physical/tactile interactions with the HMI, while for example, voice-control interactions may be disregarded. Similarly, determination of the driver being in an "inattentive state" based on HMI interactions may be further based only on specific (predefined) interactions that are more likely to result in a distraction from the road ahead of the vehicle, such as e.g. input of an address in a navigation feature or searching for a file in a list, changing specific settings of the HMI, or any other interaction requiring more focus from the driver as compared to e.g. raising the volume of the infotainment system, or other single-click or voice-control interactions.

Moving on, the method S100 further comprises determining S102 an intended path of the driver at a point in time when the driver enters the inattentive state. In some embodiments, the intended path is determined based on an assumption that the driver intends to maintain a path curvature that existed at the point in time when the driver enters the inattentive state. Moreover, the intended path may be based on a heading of the vehicle relative to a reference axis (e.g. road curvature at the vehicle's position, or any other suitable reference axis) at the point in time when the driver enters the inattentive state.

Moreover, in some embodiments, the intended path is determined based on an assumption that the driver intends to maintain a distance to a lane boundary, the distance being defined at the point in time when the driver enters the inattentive state. The lane boundary may for example be defined by lane markers of the ego-lane or a road edge/boundary of the ego-road. Similarly, in some embodiments, the intended path may be based on an assumption that the driver intends to maintain a steering wheel angle, or wheel angle, at the point in time when the driver enters the inattentive state.

Further, the method S100 comprises determining S103 an unintended lateral deviation from the intended path by computing a function representative of a lateral deviation from the intended path of the driver. The function is dependent upon at least one of:

A change in steering wheel angle while the driver is in the inattentive state.

A change in road geometry along the vehicle's traveling direction while the driver is in the inattentive state.

The method S100 further comprises activating S104 the lane support system when the determined unintended lateral deviation violates a threshold value. The lane support system is configured to output a warning to the driver and/or to execute an intervention so to control a steering of the vehicle upon detection of a lane departure of the vehicle.

Accordingly, the determined S103 unintended lateral deviation acts as a secondary criteria or authorization for the activation of the LSS, which must be fulfilled in order to allow the LSS to intervene, in order to increase the chance of catching the actual unintended lane departures. In other words, the "LSS activation" step S104 may be understood as allowing the LSS to intervene or to output a warning to the driver upon detection of a lane departure of the vehicle under the constriction that the unintended lateral deviation is above the threshold value. Thereby, the risk of having the LSS intervening and/or issuing warnings at inappropriate or unwanted situations may be effectively reduced, and overall safety increased.

As mentioned in the foregoing and as reflected in the dependencies of the function representative of the lateral deviation from the intended path may be on the steering or on road geometry aspects.

Figure 2A:
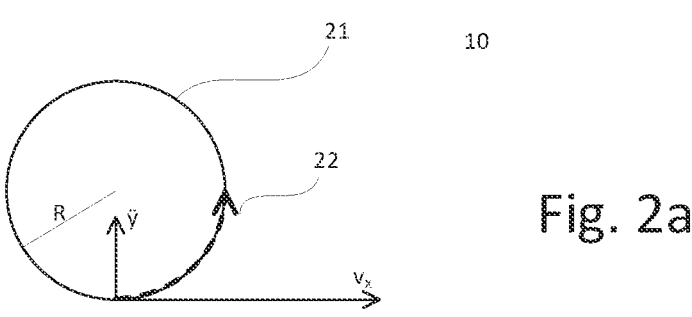
FIG. 2a is a schematic illustration indicating the relationship between lateral acceleration for a point traveling with constant speed along a circular segment.

The functions may be derived from the fact that a vehicle with constant speed and wheel angles will follow a constant radius turn 21, as schematically indicated in FIG. 2a. In more detail, the expression of the lateral acceleration ($\ddot{y}$) of a point traveling with constant speed ($v_x$) along a circular segment 22 with a radius (R) is the product between the tangential velocity squared $v_x^2$ and the curvature (1/R):

$$\ddot{y} = \frac{1}{R}v_x^2 = Cv_x^2 \tag{1}$$

Then, assuming that there is a constant factor between steering wheel angle and curvature 22, the lateral deviation ($y_1$) from the original position (i.e. caused by a change in steering wheel angle while the driver is in the inattentive state) is approximated by the double integral of the lateral acceleration:

$$y_1(t)=\iint C(\delta)v_x^2 dt=\iint k_\delta \delta v_x^2 dt \tag{2}$$

Figure 2B:
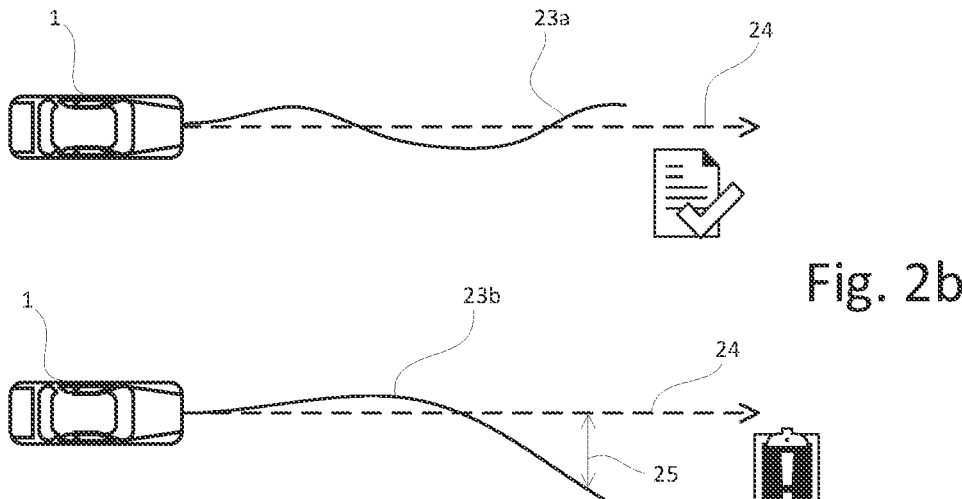
FIG. 2b is a schematic illustration indicating two scenarios for unintended lateral deviations caused by changes in steering wheel angle while the driver is in an inattentive state in accordance with some embodiments.

Here, $\delta(t)$ is the steering wheel angle as a function of time. Moreover, if the steering wheel angle is used with positive and negative sign on the two sides of the centre direction, the above expression will reflect the final deviation from a constant turn due to steering but also allow the driver to steer a little back and forth 23a around an imagined constant radius path, without causing high "mental model mismatch" i.e. unintended lateral deviation 25 as indicated in the top drawing of FIG. 2b. The bottom drawing of FIG. 2b indicates a scenario where the steering 23b results in an unintended lateral deviation 25 from the intended path 24 violates the threshold value. The threshold value may be set in accordance with a predefined safety criterion or in accordance with an agreed-upon specification.

Figure 2C:
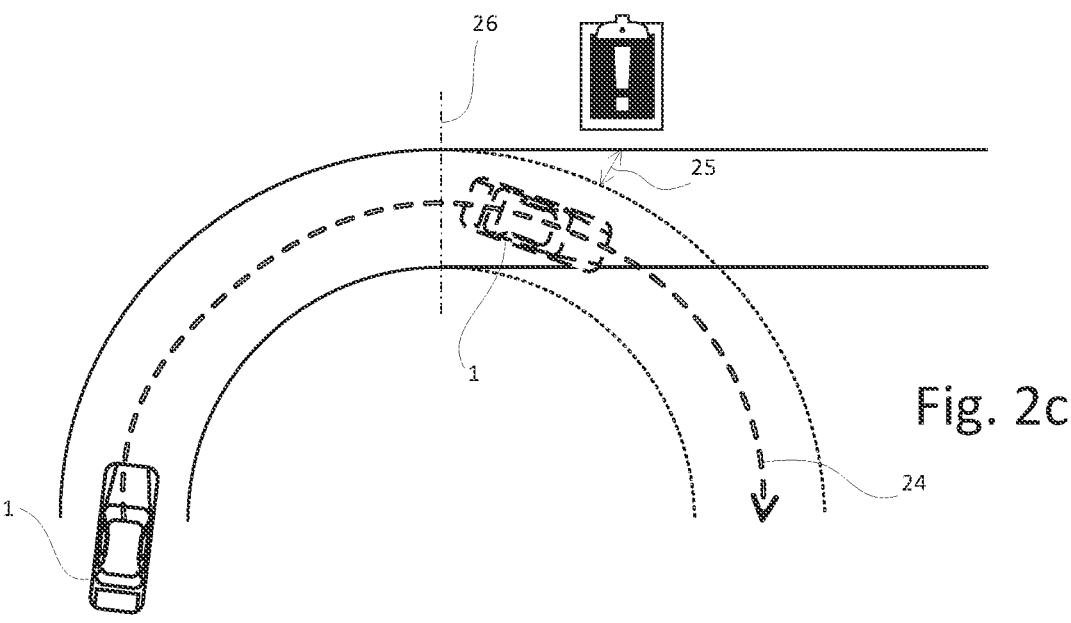
FIG. 2c is a schematic illustration indicating a scenario for an unintended lateral deviation caused by a change in road geometry while the driver is in an inattentive state in accordance with some embodiments.

Furthermore, in order to capture the (unnoticed) changes in the road geometry a similar approach is proposed. The "unawareness" is assumed to be proportional to the lateral positioning error (lateral deviation) caused by the change in curvature, i.e. change in road geometry. This is schematically illustrated in FIG. 2c. Furthermore, by making the same assumption that the unintended lateral deviation ($y_2$) 25 from the intended path 24 caused by a change in road geometry along the vehicle's 1 traveling direction while the driver is in the inattentive state, is described by a point mass traveling along a circular arc, the same expressions (1) and (2) could be used with the curvature computed from wheel angle replaced with the actual curvature of the road, see equation (3) below. The actual curvature (c(t)) of the road may for example be derived from map data (e.g. from a HD map) or from the vehicle's 1 perception system monitoring the surrounding environment of the vehicle 1.

$$y_2(t)=\iint k_c(c(t)-c_0)v_x^2 dt \tag{3}$$

In more detail, in FIG. 2c the driver is assumed to enter an inattentive state at the position of the solid-line vehicle 1, and the driver's "mental model" of the road in front of the vehicle 1 is projected as an extension of the curvature of the road at the position of the vehicle 1 when the driver enters the inattentive state ($c_0$). This "reference curvature" or "reference geometry" ($c_0$) that forms the basis for the driver's mental model may for example be the curvature of the road at the vehicle's 1 front axis, rear axis, or at a point residing at a predefined distance in front of the vehicle 1 at the point in time when the driver enters the inattentive state.

Then, while the driver is in the inattentive state, the actual curvature of the road (c(t)) is monitored and used to compute the unintended lateral deviation ($y_2$(t)) 25 caused by the change in road geometry. As indicated in FIG. 2c, the road geometry starts to change relative to the "intended path" (i.e. relative to the "mental model" of the driver) 24 at the point indicated by reference numeral 26, and an unintended lateral deviation 25 starts to build up.

Using the above two functions representative of the lateral deviations from the intended path 24 of the driver, then, in accordance with some embodiments, the driver's unawareness or the unintended lateral deviation u(t) at time t=T is defined by function (4) below.

$$u(T) = \left| k_c \int_0^T \int (c(t) - c_0)v(t)^2 dt \right| + \left| k_\delta \int_0^T \int (\delta(t) - \delta_0)v(t)^2 dt \right| \quad (4)$$

Here, the zero subscript denotes readings at t=0, where t=0 denotes the time at which the driver enters the inattentive state. Since it is advantageous to capture unintended lateral deviations 25 regardless if they are caused by an unintended steering to the right or to the left, and similarly for the direction of the curvature change, the absolute of the values are introduced.

Thus, in accordance with some embodiments, the step of computing the function representative of the lateral deviation from the intended path 24 comprises integrating, over time, a first function comprising the steering wheel angle as a function over time, in an instance when the function is dependent upon the change in steering wheel angle. Moreover, in some embodiments, the step of computing the function representative of the lateral deviation from the intended path 24 comprises integrating, over time, a second function comprising the change in road geometry along the vehicle's 1 traveling direction as a function over time, in an instance when the function is dependent upon the change in road geometry along the vehicle's 1 traveling direction.

Moreover, in some embodiments, the intended path 24 of the driver comprises a value representative of a steering wheel angle ($\delta_0$) at the point in time when the driver enters the inattentive state, in an instance when the function is dependent upon the change in steering wheel angle. Similarly, in some embodiments, the intended path 24 of the driver comprises a value representative of a curvature of an ego-lane ($c_0$) of the vehicle at the point in time when the driver enters the inattentive state, in an instance when the function is dependent upon the change in road geometry along the vehicle's traveling direction. The term "ego-lane" may be understood as the lane that the vehicle 1 is currently occupying/traveling within on the road.

Moreover, in some embodiments, the value representative of a steering wheel angle ($\delta_0$) at the point in time when the driver enters the inattentive state is determined based upon a plurality of steering wheel angle values during a period of time preceding the point in time when the driver enters the inattentive state. This further increases the chance of accurately capturing the intended path of the driver. In more detail, when driving, a driver generally moves the steering wheel back and forth around a nominal value to stay at a desired position within the lane. Consequently, the instantaneous angle at the point in time when the driver enters the inattentive state, may in some cases not exactly reflect the intended path. For example, on a straight road section, the average steering angle may better reflect the intended path 24 of the driver. However, in a scenario where the road geometry is changing, the instantaneous steering wheel angle may be better representation of the intended path.

Accordingly, in some embodiments, the intended path 24 of the driver comprises a value representative of a steering wheel angle at the point in time when the driver enters the inattentive state, in an instance when the function is dependent upon the change in steering wheel angle and the vehicle is located on a straight road portion. Moreover, in some embodiments, the value representative of a steering wheel angle at the point in time when the driver enters the inattentive state is determined based upon a plurality of steering wheel angle values during a period of time preceding the point in time when the driver enters the inattentive state when the vehicle is located on a non-straight road portion (e.g. on a curvy road).

Executable instructions for performing these functions are, optionally, included in a non-transitory computer-readable storage medium or other computer program product configured for execution by one or more processors.

Figure 3:
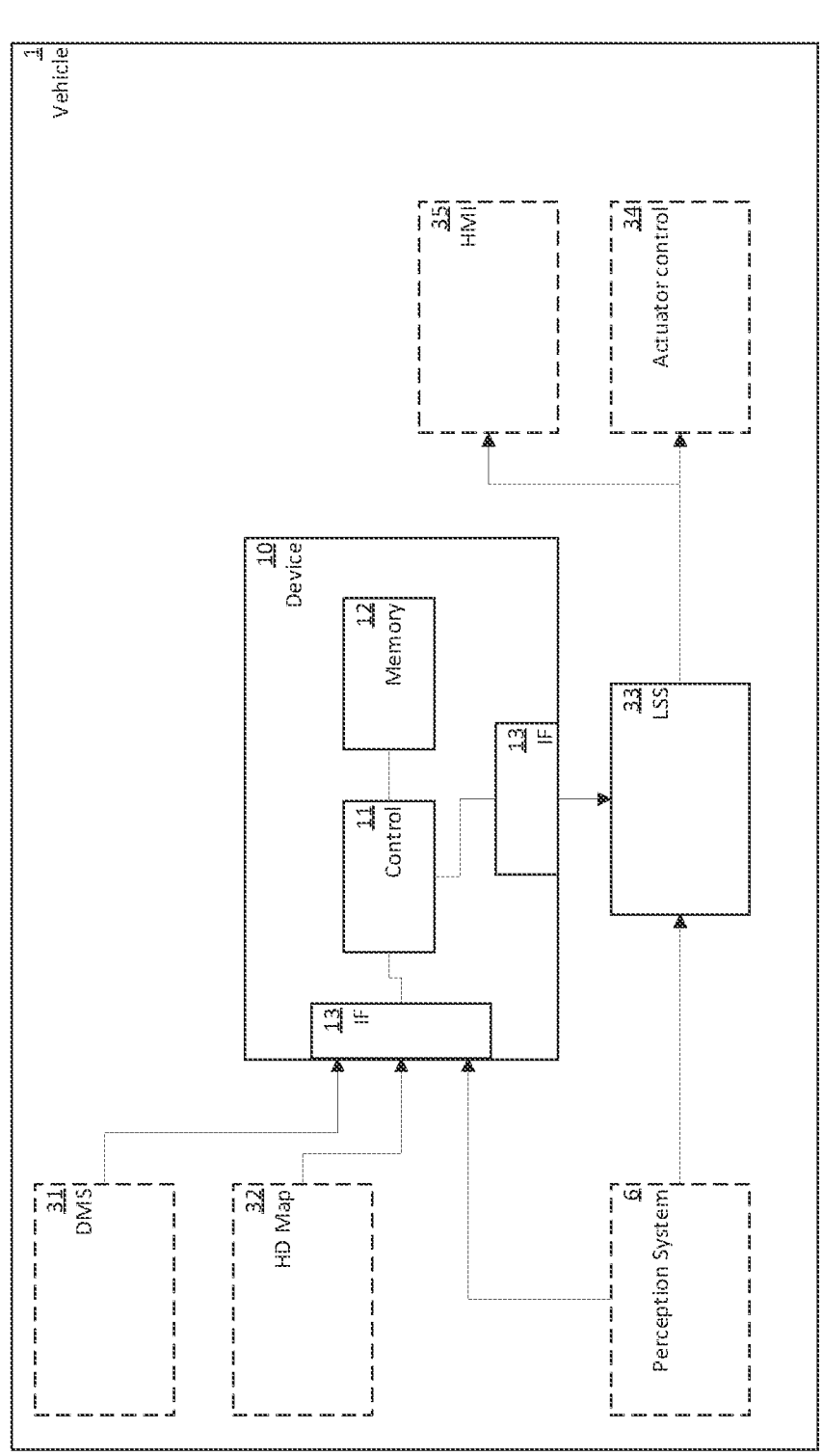
FIG. 3 is a schematic block diagram representation of a device for controlling a Lane Support System (LSS) in accordance with some embodiments.
Figure 4:
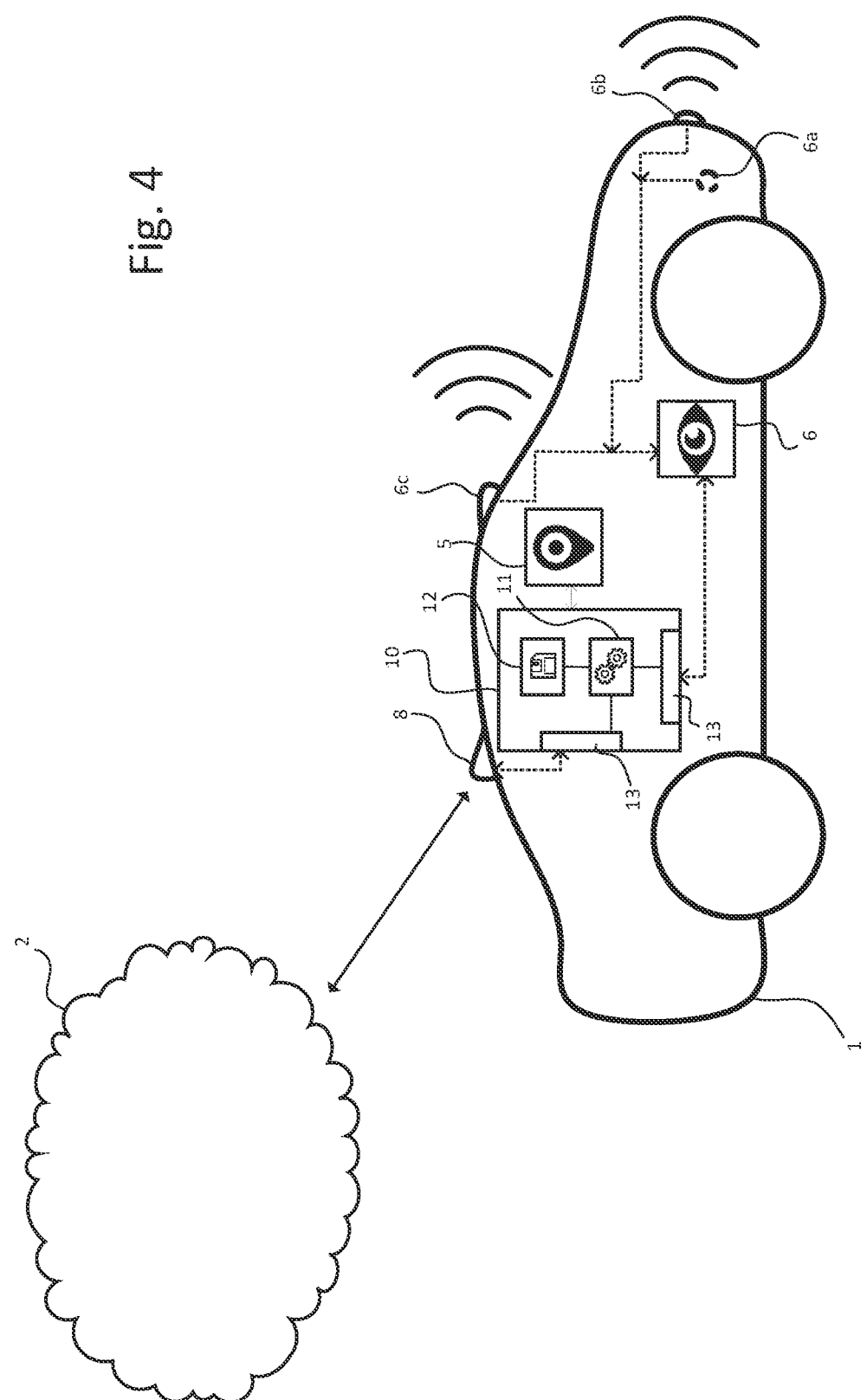
FIG. 4 is a schematic side-view illustration of a vehicle comprising a device for controlling a Lane Support System (LSS) in accordance with some embodiments.

FIG. 3 is a schematic block diagram representation of a device 10, implemented in a vehicle 1, for controlling a lane support system 33 of a vehicle 1 in accordance with some embodiments. FIG. 4 is a schematic side view illustration of a vehicle comprising a device 10 for controlling a lane support system 33 of a vehicle 1 in accordance with some embodiments.

The device 10 comprises control circuitry 11 configured to perform the functions of the methods disclosed herein, where the functions may be included in a non-transitory computer-readable storage medium 12 or other computer program product configured for execution by the control circuitry 11.

In some embodiments, the vehicle 1 comprises a perception system 6 or perception block 6, and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may be in the form of a Global Navigation Satellite System (GNSS), such as a GPS. However, the localization system may alternatively be realized as a Real Time Kinematics (RTK) GPS in order to improve accuracy.

In more detail, the perception system/block 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

In some embodiments, the control circuitry 11 is configured to obtain data indicative of a driver of the vehicle being in an inattentive state, and to determine an intended path of the driver at a point in time when the driver enters the inattentive state. The data indicative of the driver being in an inattentive state may for example be obtained from a DMS 31 of the vehicle 1. In more detail, the control circuitry 11 may be configured to receive or otherwise obtain a signal from the DMS, where the signal is indicative of the driver of the vehicle being in an inattentive state.

In more detail, the intended path of the driver reflects the driver's "mental model" of the road, i.e. the presumption that all drivers (to some extent) have an idea about the lane position when looking away from the road and then looking back up again. In some embodiments, the intended path is determined based on an assumption that the driver intends to maintain a path curvature that existed at the point in time when the driver enters the inattentive state. Alternatively, or additionally, the intended path may be determined based on an assumption that the driver intends to maintain a distance to a lane boundary, the distance being defined at the point in time when the driver enters the inattentive state.

Moving on, in some embodiments the control circuitry 11 is further configured to determine an unintended lateral deviation from the intended path by computing a function representative of a lateral deviation from the intended path of the driver. The function is dependent upon at least one of a change in steering wheel angle while the driver is in the inattentive state, and a change in road geometry along the vehicle's 1 traveling direction while the driver is in the inattentive state.

Furthermore, the control circuitry 11 is configured to activate the lane support system 33 of the vehicle 1 when the determined unintended lateral deviation violates a threshold value. The lane support system 33 is configured to output a warning to the driver and/or to execute an intervention so to control a steering of the vehicle 1 upon detection of a lane departure of the vehicle 1. In more detail, the LSS 33 may be configured to output a signal to an HMI 35 of the vehicle to display a warning or otherwise inform the driver of an approaching or actual lane departure. Alternatively, or additionally the LSS 33 may be configured to output a signal to an actuator control module 34 of the vehicle 1 so to control a steering of the vehicle 1.

Accordingly, the LSS 33 may receive data from the vehicle's perception system 6 at an input of the LSS 33, where the received data indicates that the vehicle is about to, or has crossed, a lane boundary. In more detail, the perception system 6 may be configured to output data indicative of the position of the ego-lane boundary relative to the vehicle 1 by means of lane tracking algorithm. Then, the LSS may be configured to process this output from the perception system to execute an intervention (i.e. to control a steering of the vehicle) so to keep the vehicle within the lane boundaries or to output a warning to a driver of the vehicle 1, under the assumption that the unintended lateral deviation exceeds a threshold value.

Thus, as mentioned in the foregoing, the determination of the unintended lateral deviation exceeding a threshold value acts as a secondary criterion that must be fulfilled for the LSS 33 to be allowed to execute interventions and/or output warnings to the driver of the vehicle 1.

In some embodiments, the control circuitry 11 is configured to compute the function representative of the lateral deviation from the intended path by integrating, over time, a first function comprising the steering wheel angle as a function over time, in an instance when the function is dependent upon the change in steering wheel angle. Moreover, in some embodiments, the control circuitry 11 is configured to compute the function representative of the lateral deviation from the intended path by integrating, over time, a second function comprising the change in road geometry along the vehicle's traveling direction as a function over time, in an instance when the function is dependent upon the change in road geometry along the vehicle's traveling direction. The actual road geometry may for example be derived from map data (e.g. from a HD map 32) or from the vehicle's 1 perception system 6 monitoring the surrounding environment of the vehicle 1, in order to compute the unintended lateral deviation caused by a change in road geometry.

In some embodiments, the value representative of a steering wheel angle at the point in time when the driver enters the inattentive state is determined based upon a plurality of steering wheel angle values during a period of time preceding the point in time when the driver enters the inattentive state.

Furthermore, in some embodiments, the intended path of the driver comprises a value representative of a steering wheel angle at the point in time when the driver enters the inattentive state, in an instance when the function is dependent upon the change in steering wheel angle. In some embodiments, the intended path of the driver comprises a value representative of a curvature of an ego-lane of the vehicle at the point in time when the driver enters the inattentive state, in an instance when the function is dependent upon the change in road geometry along the vehicle's traveling direction.

Further, the vehicle 1 may be connected to external network(s) 2 via for instance a wireless link (e.g. for retrieving map data). The same or some other wireless link may be used to communicate with other vehicles in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the device 10) may be or include any number of hardware components for conducting data or signal processing or for executing computer code stored in memory 12. The device 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 13 may also provide the possibility to acquire sensor data directly or via dedicated sensor control circuitry 6 in the vehicle. The device may also have a communication/antenna interface 13 that may further provide the possibility to send output to a remote location (e.g. remote operator or control centre) by means of the antenna 8. Moreover, some sensors in the vehicle may communicate with the device 10 using a local network setup, such as CAN bus, I2C, Ethernet, optical fibres, and so on. The communication interface 13 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, sensor data may be sent to an external system and that system performs the determination of the unintended lateral deviation by computing the function representative of the lateral deviation. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A computer-implemented method for controlling a lane support system of a vehicle, the method comprising:
   obtaining data indicative of a driver of the vehicle being in an inattentive state;
   determining an intended path of the driver at a point in time when the driver enters the inattentive state, wherein the intended path is determined based on an assumption that the driver intends to maintain a path curvature that existed at the point in time when the driver enters the inattentive state;
   determining an unintended lateral deviation from the intended path by computing a function representative of a lateral deviation from the intended path of the driver, wherein the function is dependent upon at least one of:
   a change in steering wheel angle while the driver is in the inattentive state, and
   a change in road geometry along the vehicle's traveling direction while the driver is in the inattentive state;
   activating the lane support system when the determined unintended lateral deviation violates a threshold value, wherein the lane support system is configured to output a warning to the driver and/or to execute an intervention so to control a steering of the vehicle upon detection of a lane departure of the vehicle.

2. The method according to claim 1, wherein the step of obtaining data indicative of the driver of the vehicle being in an inattentive state comprises:
   obtaining a signal from a Driver Monitoring System (DMS) of the vehicle, the signal being indicative of the driver of the vehicle being in the inattentive state.

3. The method according to claim 1, wherein the intended path is determined based on an assumption that the driver intends to maintain a distance to a lane boundary, the distance being defined at the point in time when the driver enters the inattentive state.

4. The method according to claim 1, wherein the intended path of the driver comprises:

a value representative of a steering wheel angle at the point in time when the driver enters the inattentive state, in an instance when the function is dependent upon the change in steering wheel angle;

a value representative of a curvature of an ego-lane of the vehicle at the point in time when the driver enters the inattentive state, in an instance when the function is dependent upon the change in road geometry along the vehicle's traveling direction.

5. The method according to claim 4, wherein the value representative of a steering wheel angle at the point in time when the driver enters the inattentive state is determined based upon a plurality of steering wheel angle values during a period of time preceding the point in time when the driver enters the inattentive state.

6. The method according to claim 1, wherein the step of computing the function representative of the lateral deviation from the intended path comprises:

integrating, over time, a first function comprising the steering wheel angle as a function over time, in an instance when the function is dependent upon the change in steering wheel angle; and integrating, over time, a second function comprising the change in road geometry along the vehicle's traveling direction as a function over time, in an instance when the function is dependent upon the change in road geometry along the vehicle's traveling direction.

7. A computer-readable storage medium comprising instructions which, when executed by a computing device, causes the computing device to carry out the method according to claim 1.

8. A device for controlling a lane support system of a vehicle, the device comprising a control circuitry configured to:

obtain data indicative of a driver of the vehicle being in an inattentive state;

determine an intended path of the driver at a point in time when the driver enters the inattentive state, wherein the intended path is determined based on an assumption that the driver intends to maintain a path curvature that existed at the point in time when the driver enters the inattentive state;

determine an unintended lateral deviation from the intended path by computing a function representative of a lateral deviation from the intended path of the driver, wherein the function is dependent upon at least one of:

a change in steering wheel angle while the driver is in the inattentive state, and a change in road geometry along the vehicle's traveling direction while the driver is in the inattentive state;

activate the lane support system of the vehicle when the determined unintended lateral deviation violates a threshold value, wherein the lane support system is configured to output a warning to the driver and/or to execute an intervention so to control a steering of the vehicle upon detection of a lane departure of the vehicle.

9. The device according to claim 8, wherein the control circuitry is configured to obtain data indicative of the driver of the vehicle being in an inattentive state by:

obtaining a signal from a Driver Monitoring System (DMS) of the vehicle, the signal being indicative of the driver of the vehicle being in the inattentive state.

10. The device according to claim 8, wherein the intended path of the driver comprises:

a value representative of a steering wheel angle at the point in time when the driver enters the inattentive state, in an instance when the function is dependent upon the change in steering wheel angle;

a value representative of a curvature of an ego-lane of the vehicle at the point in time when the driver enters the inattentive state, in an instance when the function is dependent upon the change in road geometry along the vehicle's traveling direction.

11. The device according to claim 10, wherein the value representative of a steering wheel angle at the point in time when the driver enters the inattentive state is determined based upon a plurality of steering wheel angle values during a period of time preceding the point in time when the driver enters the inattentive state.

12. The device according to claim 8, wherein the control circuitry is configured to compute the function representative of the lateral deviation from the intended path by:

integrating, over time, a first function comprising the steering wheel angle as a function over time, in an instance when the function is dependent upon the change in steering wheel angle; and integrating, over time, a second function comprising the change in road geometry along the vehicle's traveling direction as a function over time, in an instance when the function is dependent upon the change in road geometry along the vehicle's traveling direction.

13. A vehicle comprising:

a lane support system; and a device for controlling the lane support system of a vehicle, the device comprising a control circuitry configured to:

obtain data indicative of a driver of the vehicle being in an inattentive state;

determine an intended path of the driver at a point in time when the driver enters the inattentive state, wherein the intended path is determined based on an assumption that the driver intends to maintain a path curvature that existed at the point in time when the driver enters the inattentive state;

determine an unintended lateral deviation from the intended path by computing a function representative of a lateral deviation from the intended path of the driver, wherein the function is dependent upon at least one of:

a change in steering wheel angle while the driver is in the inattentive state, and a change in road geometry along the vehicle's traveling direction while the driver is in the inattentive state;

activate the lane support system of the vehicle when the determined unintended lateral deviation violates a threshold value, wherein the lane support system is configured to output a warning to the driver and/or to execute an intervention so to control a steering of the vehicle upon detection of a lane departure of the vehicle.

* * * * *